United States Patent [19]
Menzer et al.

[11] Patent Number: 5,623,768
[45] Date of Patent: Apr. 29, 1997

[54] METHOD FOR DETERMINING AN EXTENSION OF AN OBJECT BY MEANS OF AN EXTENSOMETER AND EXTENSOMETER FOR PERFORMING THE METHOD

[75] Inventors: Wolfgang Menzer, Lohmar; Kunibert Förster, Kürten-Dürscheid; Josef Becher, Overath, all of Germany

[73] Assignee: Siemens Aktiengesellschaft, Munich, Germany

[21] Appl. No.: 309,952

[22] Filed: Sep. 21, 1994

Related U.S. Application Data

[63] Continuation of PCT/DE93/00230, Mar. 15, 1993.

[30] Foreign Application Priority Data

Mar. 26, 1992 [DE] Germany .............................. 9204103 U

[51] Int. Cl.$^6$ ...................................................... G01B 7/16
[52] U.S. Cl. .................................................. 33/787; 33/790
[58] Field of Search .............................. 33/787, 788, 789, 33/790; 73/780, 781

[56] References Cited

U.S. PATENT DOCUMENTS 4,098,000  7/1978  Egger ......................................... 33/788

FOREIGN PATENT DOCUMENTS

| 0088278 | 5/1987 | European Pat. Off. . |
| 3239877 | 5/1984 | Germany . |
| 2816444 | 9/1984 | Germany . |
| 3410840 | 6/1985 | Germany . |
| 8803392 | 8/1988 | Germany . |
| 3921237 | 1/1991 | Germany . |
| 0201502 | 8/1988 | Japan ........................................ 73/780 |

*Primary Examiner*—Christopher W. Fulton
*Attorney, Agent, or Firm*—Herbert L. Lerner; Laurence A. Greenberg

[57] ABSTRACT

A method for determining an extension of an object with an extensometer, and an extensometer for performing the method, include two legs being movable in a spreading plane and each having one end connected to a joint and another end connected to the object, with the extension spreading the legs apart. The spreading plane is oriented approximately parallel to a surface of the object between the other ends of the legs. Foot-plates, each being carried by a respective one of the legs, being oriented in the spreading plane and having a region projecting beyond the other ends of the legs, are fastened to the object at the region.

14 Claims, 3 Drawing Sheets

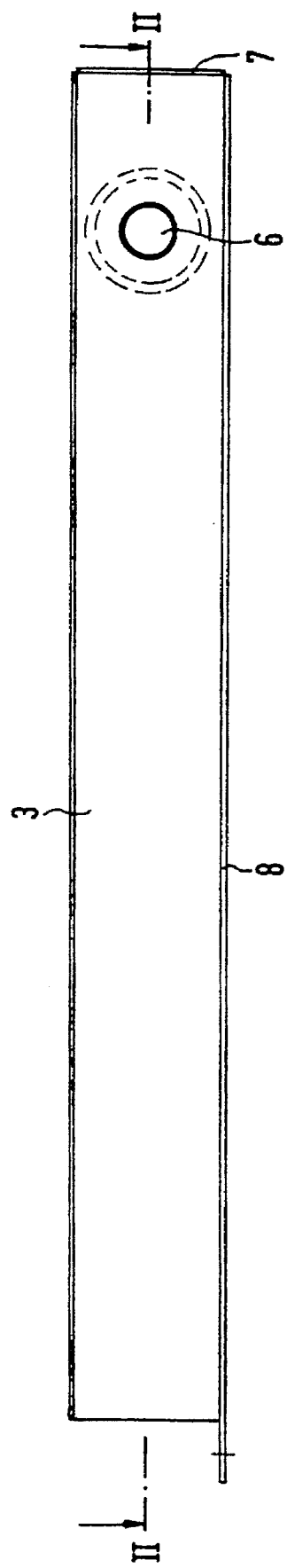

METHOD FOR DETERMINING AN EXTENSION OF AN OBJECT BY MEANS OF AN EXTENSOMETER AND EXTENSOMETER FOR PERFORMING THE METHOD

CROSS-REFERENCE TO RELATED APPLICATION

This application is a Continuation of International Application Ser. No. PCT/DE93/00230, filed Mar. 15, 1993.

BACKGROUND OF THE INVENTION

Field of the Invention

The invention relates to a method for determining an extension of an object by means of an extensometer having two legs which are each connected at one end to a joint, are movable in a spreading plane and are each connected at the other end to the object, so that the extension spreads the legs apart. The invention furthermore relates to an extensometer for carrying out the method.

Extensometers of the type mentioned above have two usually approximately straight legs which are each connected at one end to a joint, are movable in a spreading plane and are each connected at the other end to the object. The spreading plane is oriented essentially perpendicularly to a surface of the object between the other ends of the legs, that is to say between the connection points of the legs to the object. The extensometer therefore "stands" on the surface in the manner of a step ladder.

Such extensometers and methods for using them are known from European Patent No. 0 088 278 B1, German Published, Non-Prosecuted Application DE 32 39 877 A1 and German Published, Non-Prosecuted Application DE 34 10 840 A1. The methods or the modes of operation of the extensometers are based on the fact that the two legs of the extensometers are fastened at their free ends to points of the object to be monitored which are distant from one another in the direction of the extension to be determined and are spread when the extension occurs. The legs are connected to one another at their other ends by means of a joint. As a result of the spreading of the legs, for example, the spacing between two capacitor plates, each of which is fastened to one of the legs, and therefore the capacitance of the capacitor configuration formed by the capacitor plates, is varied. The change in capacitance is in a fixed relation to the spreading of the legs and therefore in a fixed relation to the extension.

The known extensometers allow only the detection of extensions within a range of some tenths of a millimeter, and furthermore presuppose that the two fastening points of the legs move away from one another essentially only in a straight line when the extension occurs. A rotation of the legs relative to one another, as often happens when a load is exerted on fracture samples of the customary kind, is impossible or leads to disturbing torsional loads on the extensometer. Moreover, because of the thickness of conventional capacitor plates, the minimum spacing of the legs amounts to several millimeters. That can be unfavorable if the detection of extensions is to take place between two points which are initially located closely adjacent one another, for example on both sides of a crack, the widening speed of which is to be investigated.

German Utility Model G 88 03 392 U1 discloses a displacement sensor having two legs which can be applied to a material sample and which have, at their free ends, pick-up elements, by which the displacement sensor is fixed to the material sample. A measured quantity proportional to a change in displacement is supplied through at least one strain gauge fastened to the displacement sensor. The legs of the displacement sensor are formed of resiliently elastic steel. They are fastened to the material sample in such a way that spreading occurs in a spreading plane parallel to the surface of the material sample.

European Patent No. 0 088 278 B1 discloses an extensometer having two legs which are each connected at one end to a joint and are each to be connected at the other end to an object to be investigated. The legs stand on the object. In other words, a spreading plane defined by the spreading of the legs is perpendicular to the surface of the object. In order to fasten them to the object, each leg has holding strips which are laid onto the object.

SUMMARY OF THE INVENTION

It is accordingly an object of the invention to provide a method for determining an extension of an object by means of an extensometer and an extensometer for performing the method, which overcome the hereinafore-mentioned disadvantages of the heretofore-known methods and devices of this general type and which make it possible to measure extensions which occur between two points that are closely adjacent one another and can deviate by several millimeters. The determination of an extension of an object is also to be possible even when the object is heated to high temperatures, for example up to 700° C., such as in the course of creep-rupture tests.

Finally, the determination of an extension is also to be possible even when fastening points of legs of the extensometer do not only move away from one another in a straight line, but additionally rotate relative to one another.

With the foregoing and other objects in view there is provided, in accordance with the invention, in a method for determining an extension of an object with an extensometer including two legs being movable in a spreading plane and each having one end connected to a joint and another end connected to the object, with the extension spreading the legs apart, the improvement which comprises orienting the spreading plane approximately parallel to a surface of the object between the other ends of the legs; and fastening foot-plates, each being carried by a respective one of the legs, being oriented in the spreading plane and having a region projecting beyond the other ends of the legs, to the object at the region.

According to the invention, an extensometer for determining an extension of an object is not placed onto the object in the manner of a step ladder, so that the spreading plane is oriented approximately perpendicularly to the surface of the object between the ends of the legs that are fastened to the object, but instead the extensometer is laid onto the object in such a way that the spreading plane is oriented approximately parallel to the surface of the object between the other ends of the legs. The advantage of this configuration of the extensometer is, in particular, that, in addition to the movement of the connection points relative to one another in the direction of the extension, movements perpendicular to the direction of the extension are also possible. Such movements no longer lead to a torsion of the extensometer, as is known from the state of the art, but merely to slight rotations of the extensometer without torsion. The determination of the extension is scarcely influenced by such rotations, as long as these rotations remain restricted to a particular amount.

The method can therefore be used in many instances where the methods of the state of the art could no longer be employed in view of the torsion of the extensometer. Furthermore, in order to put the method into practice, the legs of the extensometer can be lengthened almost as desired, with the result that the dependence of the spreading of the legs on the extension to be determined can be varied within wide limits. In particular, by varying the dependence of the spreading on the extension, the dependence of the measurement signals obtained by a measuring device on the extension can be adapted to the requirements of the particular individual instance substantially better than heretofore for all types of measuring devices inserted between the legs, especially for a capacitive measuring device. In particular, for a measuring device in the form of a capacitor configuration, it is possible, by varying the length of the legs, to ensure that the capacitance of the capacitor configuration, being measured as a criterion of the extension, is essentially linearly dependent on the extension to be determined. Moreover, there is a possibility of varying the spacing of the connection points of the legs to the object within wide limits and, in particular, of making it very small, so that it is easily possible to determine an extension on a fracture sample, although a spacing of approximately 5 mm between the connection points would have to be adhered to as standard. The method is also especially suitable for use on objects which are heated to high temperatures, since the extensometer is directly adjacent the object and therefore cannot be impaired by temperature gradients together with the mechanical stresses resulting therefrom.

In accordance with another mode of the invention, the connection points between the legs and the object are essentially spot-shaped and are preferably formed by welding, especially spot welding. Such connection points provide a simple way of allowing some rotation of the extensometer in the spreading plane, in order, for example, to compensate for displacements of the connection points perpendicularly to the direction of the extension. The desired determination of the extension can thereby take place with particular accuracy. It has been shown, surprisingly, that spot welds are preeminently suitable for absorbing the forces and moments which occur at the connection points between the legs and the object and, in particular, allow the small rotations necessary for compensating movements perpendicular to the extension direction.

In accordance with a further mode of the invention, the extension of the object is determined by measuring a capacitance, dependent on the spreading of the legs, of a capacitor configuration fastened to the legs. As already mentioned, the freedom of the method in terms of construction makes it possible in many ways to adapt the extensometer to the requirements of a capacitor configuration and, in particular, makes it possible to provide an essentially linear relation between the capacitance of the capacitor configuration and the extension.

In accordance with an added mode of the invention, the method is especially suitable for monitoring a crack in the object, wherein the crack is bridged by the extensometer and the extension which is caused by the growth of the crack is being determined. This arises, in particular, because the method is largely independent of relative movements of the connection points perpendicularly to the direction of the extension, that is to say, in actual fact, to the direction of the growth of the crack.

For these reasons, in accordance with an additional mode of the invention, the method is also especially suitable for use on fracture samples, particularly for determining the growth of a crack on such a fracture sample.

With the objects of the invention in view, there is also provided an extensometer for determining an extension of an object, comprising two legs being movable in a spreading plane and each having one end connected at a joint and another end to be connected to an object having an extension spreading the legs apart; and foot-plates each being carried by a respective one of the legs, being oriented in the spreading plane and having a region projecting beyond the other ends of the legs, for fastening the foot-plates to the object at the region.

Through the use of such foot-plates, the extensometer can be placed onto the object to be investigated and can be fastened to this object. Each foot-plate advantageously forms a support for the leg to which it belongs, but advantageously does not project towards the other leg under the leg to which it is fastened.

In accordance with another feature of the invention, an inner edge of each foot-plate directed towards the other respective leg is disposed in such a way that it butts onto a longitudinal edge of the leg to which it is fastened. Each foot-plate projects beyond the end of the leg to which it is fastened, thereby affording a simple possibility for making the fixed connection between the leg and the object.

In accordance with a further feature of the invention, in the non-loaded state, the legs are oriented at least approximately parallel to one another. In particular, this makes it easier to adjust measuring devices which are disposed between the legs for measuring the extension.

In accordance with an added feature of the invention, the joint between the legs of the extensometer is a flexible link. As a result, an especially high movability of the legs, along with low spring forces between the legs, is obtained during a spreading.

In accordance with an additional feature of the invention, in order to measure the spreading or extension, there is provided a capacitor configuration, which has a capacitance dependent on the spreading of the legs and is fastened to the legs. The advantages of the capacitor configuration have already been explained in detail.

In accordance with a concomitant feature of the invention, there is provided a capacitor plate belonging to the capacitor configuration which is fastened to each leg, the capacitor plates being oriented approximately parallel to one another. In this way, the capacitance of the capacitor configuration is determined directly by means of the spacing between the capacitor plates, thus resulting in a simple dependence between the spreading and the capacitance.

Other features which are considered as characteristic for the invention are set forth in the appended claims.

Although the invention is illustrated and described herein as embodied in a method for determining an extension of an object by means of an extensometer and an extensometer for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a side-elevational view of the extensometer, which is taken along a line III—III of FIG. 2.

DESCRIPTION OF THE PREFERRED EMBODIMENTS

Figure 1:
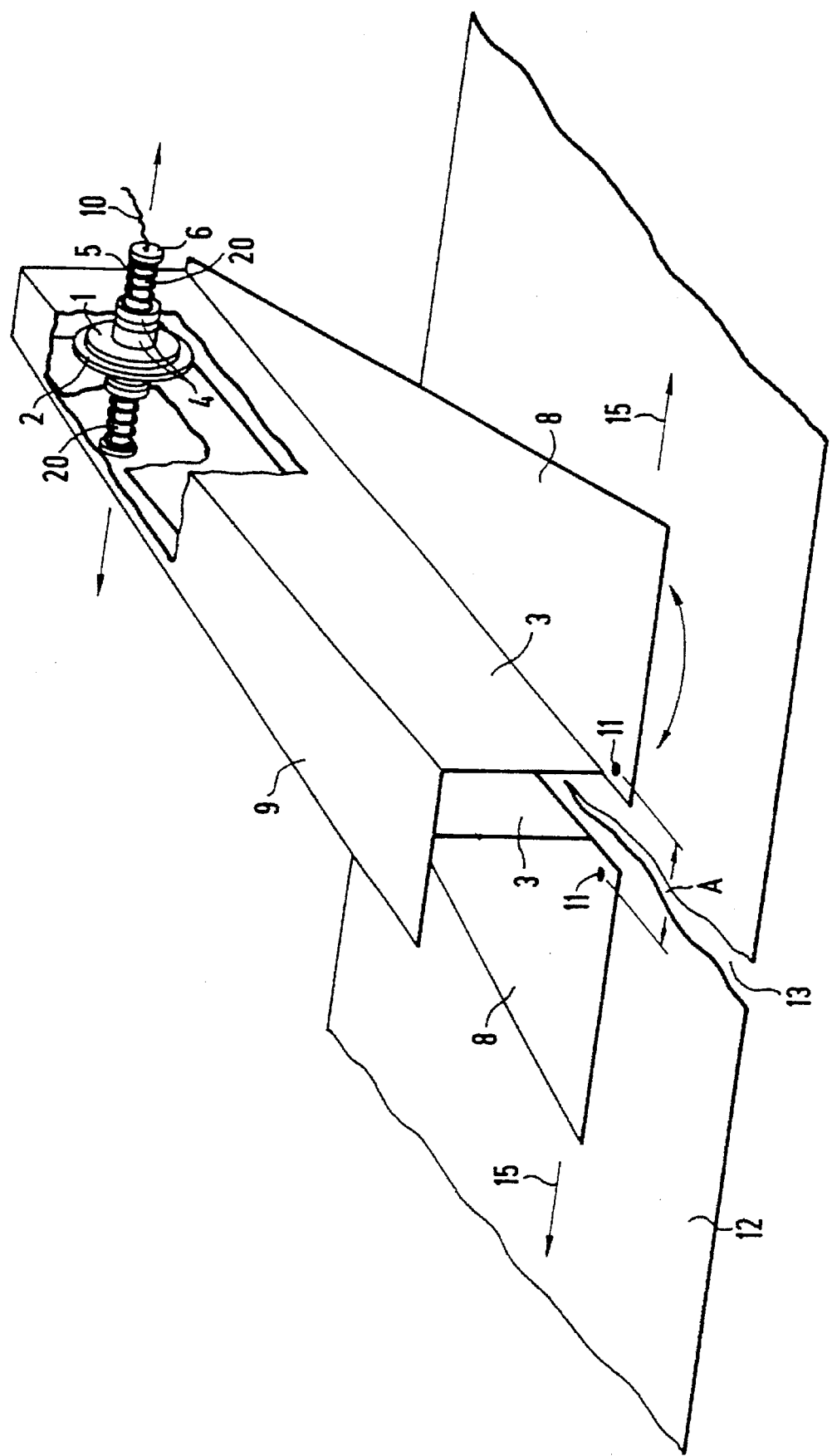
FIG. 1 is a fragmentary, diagrammatic, partly broken-away perspective view of an extensometer on a crack to be monitored.
Figure 2:
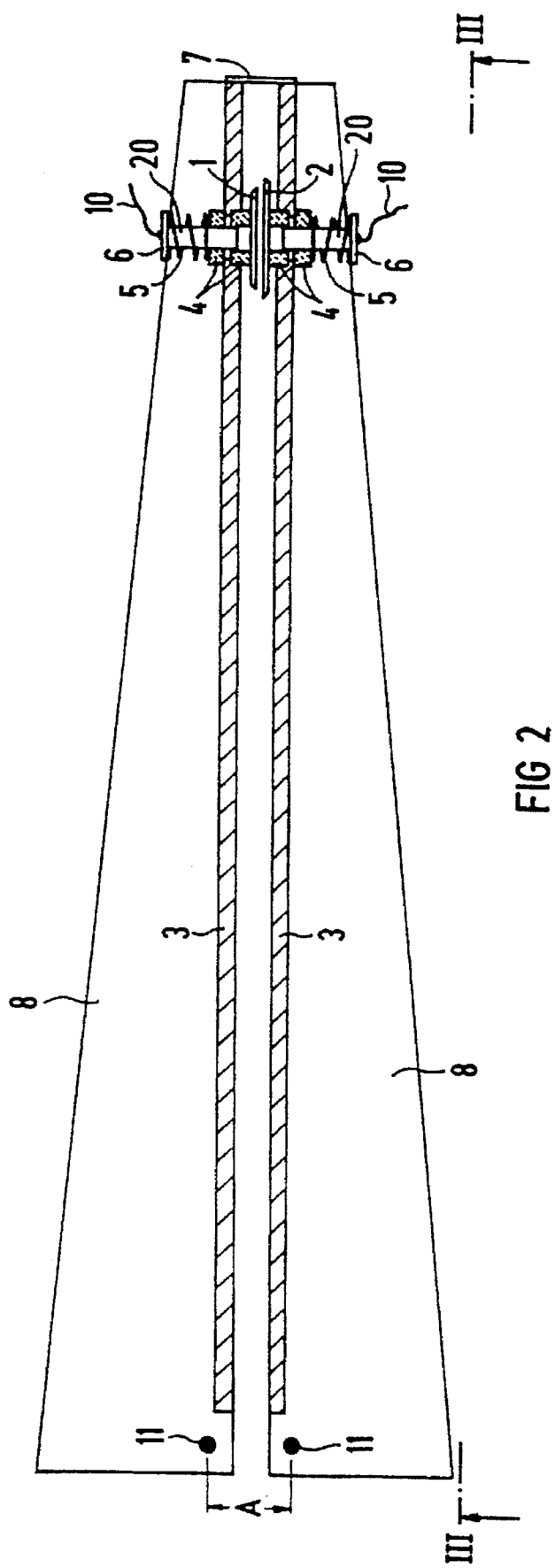
FIG. 2 is a cross-sectional view of the extensometer, which is taken along a line II—II of FIG. 3, in the direction of the arrows.

Referring now in detail to FIGS. 1–3 of the drawing as a whole, there is seen an extensometer that is formed of two legs 3 which, in the non-loaded state, are oriented at least approximately parallel to one another and between which two round capacitor plates 1, 2 are disposed, each at a rear end of a leg 3. These capacitor plates 1, 2 are fastened at the end on metal shafts 20 and have different diameters, in order to prevent measuring errors as a result of parallel displacements relative to one another.

The capacitor plates 1, 2 are insulated from the legs 3 by insulation pieces, in particular by ceramic rings 4 placed under them. Such rings 4 are also located on the sides of the legs 3 facing away from the capacitor plates 1, 2. The capacitor plates 1, 2 are fixed by means of helical springs 5 supported on spring plates 6. The legs 3 are connected to one another at their rear ends by means of a flexible link 7 which performs the function of a joint. Furthermore, the legs 3 are each provided with a foot-plate 8 disposed at right angles to them. The foot-plates 8 are trapezoidal and narrow rearwards. Inner edges of the foot-plates 8 butt onto lower longitudinal edges of the legs 3. Each foot-plate 8 is fastened in this case to an associated leg 3. Alternatively, the legs 3 and the associated foot-plates 8 can also be respectively formed of a single corresponding angle piece, which is preferably made of metal. The foot-plates 8 project beyond front ends of the legs 3. A guide sheet 9 is fastened to the top of only one of the legs 3 at right angles, in order to prevent the legs 3 from tilting relative to one another. The guide sheet 9 can also provide shielding functions for the capacitor configuration formed from the capacitor plates 1, 2. The shafts 20 and therefore the capacitor plates 1, 2 are connected through connections or wires 10 to a non-illustrated measuring and indicating unit, by means of which the capacitance of the capacitor configuration 1, 2 can be measured, thus giving an indication as to the spacing of the capacitor plates 1, 2 from one another and therefore as to the degree of spreading of the legs 3.

Front ends of the foot-plates 8 are each fastened by means of a welding spot 11 to an object 12, for example a tube. An extension of the object 12 in the direction of arrows 15 is to be measured or monitored. This extension can be relatively great and it can amount to several millimeters. This is especially important when a crack 13 has formed in the object 12 as illustrated, and the crack 13 widens further under a non-illustrated load and is to be monitored by the extensometer. The welding spots 11 are placed in such a way that the crack 13 is located between the front ends of the foot-plates 8. A respective one of the legs 3 is fastened on each side of the crack 13. This construction makes it possible to bring the welding spots 11 very close to the crack 13. A spacing A between the two welding spots 11 need amount to only a few millimeters, for example approximately 5 mm. Even only a slight widening of the crack 13 is indicated reliably as a result of the length of the legs 3. During such a widening of the crack 13, the front ends of the legs 3 move away from one another. A spreading of the legs 3 occurs while the rear ends of the legs 3 are retained by the link 7. The spreading of the legs 3 takes place in a spreading plane which is oriented approximately parallel to the surface of the object 12 between the welding spots 11. The extensometer therefore rests on the surface of the object 12.

It is evident from FIG. 1 that the legs 3 and the foot-plates 8 can be relatively long. The capacitor plates 1, 2 can, in principle, be disposed in any desired position between the legs 3, and the choice of position can be made according to various criteria. The extensometer is especially suitable for high temperatures such as occur, for example, in pipelines for hot fluids in power stations. With suitable materials, a use up to 700° C. is directly possible.

We claim:

1. In a method for determining an extension of an object with an extensometer including two legs being movable in a spreading plane and each having one end connected to a joint and an other end connected to the object with the extensometer with the spreading plane approximately parallel to a surface of the object between the other ends of the legs; and fastening foot-plates, each being carried by a respective one of the legs, being oriented in the spreading plane and having a region projecting beyond the other ends of the legs, to the object at the respective region.

2. The method according to claim 1, which comprises connecting each of the legs to the object at an essentially spot-shaped connection point.

3. The method according to claim 1, which comprises welding each of the foot-plates to the object at an essentially spot-shaped connection point.

4. The method according to claim 1, which comprises spot welding each of the foot-plates to the object.

5. The method according to claim 1, which comprises fastening a capacitor configuration to the legs, and measuring a capacitance of the capacitor configuration being dependent on the spreading of the legs for determining the extension.

6. The method according to claim 1, which comprises bridging a crack in the object with the extensometer, for monitoring the crack and determining the extension caused by growth of the crack.

7. The method according to claim 1, which comprises connecting the legs to a fracture sample being the object.

8. An extensometer for determining an extension of an object, comprising:

two legs being movable parallel to a spreading plane and each having one end connected at a joint and an other end to be connected to an object having an extension spreading said legs apart; and foot-plates each being carried by a respective one of said legs, being oriented in the spreading plane and having a region projecting beyond said other ends of said legs, for fastening said foot-plates to the object at said region.

9. The extensometer according to claim 8, wherein said legs have longitudinal edges, and each of said foot-plates projects from a respective one of said longitudinal edges and away from a respectively opposite leg.

10. The extensometer according to claim 8, wherein said legs are oriented at least approximately parallel to one another, in a non-loaded state.

11. The extensometer according to claim 8, wherein said joint is a flexible link.

12. The extensometer according to claim 8, including a capacitor configuration being fastened to said legs and having a capacitance being dependent on the spreading of said legs.

13. The extensometer according to claim 12, wherein said capacitor configuration has capacitor plates each being fastened to a respective one of said legs.

14. The extensometer according to claim 13, wherein said capacitor plates are oriented approximately parallel to one another.

* * * * *